(12) United States Patent
Gupta et al.

(10) Patent No.: US 11,902,256 B2
(45) Date of Patent: Feb. 13, 2024

(54) MEDIA ACCESS CONTROL SECURITY (MACSEC) ENABLED LINKS OF A LINK AGGREGATION GROUP (LAG)

(71) Applicant: Juniper Networks, Inc., Sunnyvale, CA (US)

(72) Inventors: Amit Kumar Gupta, Bengaluru (IN); Anand Vardhan, Bangalore (IN); Bavithra Gopalakrishnan, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 310 days.

(21) Appl. No.: 17/444,936

(22) Filed: Aug. 12, 2021

(65) Prior Publication Data

US 2021/0377226 A1     Dec. 2, 2021

Related U.S. Application Data

(63) Continuation of application No. 16/415,494, filed on May 17, 2019, now Pat. No. 11,115,389.

(51) Int. Cl.
*H04L 9/40*      (2022.01)
*G06F 16/23*    (2019.01)
(Continued)

(52) U.S. Cl.
CPC .......... *H04L 63/04* (2013.01); *G06F 16/2379* (2019.01); *H04L 45/245* (2013.01); *H04L 67/141* (2013.01)

(58) Field of Classification Search
CPC ..... H04L 63/04; H04L 45/245; H04L 67/141; H04L 63/162; H04L 47/41; H04L 63/0428; H04L 45/02; G06F 16/2379; Y02D 30/50
See application file for complete search history.

(56) References Cited

U.S. PATENT DOCUMENTS 9,686,383 B2 *   6/2017   Zhou ...................... H04L 69/28
9,705,799 B2 *   7/2017   Kotalwar .............. H04L 45/245
(Continued)

FOREIGN PATENT DOCUMENTS

| CN | 102474467 A | 5/2012 |
| CN | 104025552 A | 9/2014 |
| CN | 107580768 A | 1/2018 |
| CN | 107819685 A | 3/2018 |
| EP | 3316528 A1 | 5/2018 |

OTHER PUBLICATIONS

Extended European Search report for Application No. EP19181897.0, dated Jul. 30, 2019, 10 pages.

*Primary Examiner* — J. Brant Murphy
(74) *Attorney, Agent, or Firm* — Harrity & Harrity, LLP

(57) ABSTRACT

A device may cause a Media Access Control Security (MACsec) session to be established on a first link of a link aggregation group (LAG) that includes a plurality of links with a different device. The device may cause a data structure to be updated to identify the first link as a MACsec enabled LAG link and may send traffic via the first link. The device may cause a MACsec session to be established on at least one additional link of the LAG and may cause the data structure to be updated to identify the at least one additional link as a MACsec enabled LAG link. The device may send, after causing the data structure to be updated to identify the at least one additional link as a MACsec enabled LAG link, additional traffic via the first link and the at least one additional link.

20 Claims, 11 Drawing Sheets

(51) Int. Cl.
*H04L 45/24* (2022.01)
*H04L 67/141* (2022.01)

(56) References Cited

U.S. PATENT DOCUMENTS

| | | | |
|---|---|---|---|
| 2010/0293408 A1* | 11/2010 | Shannon | H04L 41/08 709/224 |
| 2014/0093072 A1* | 4/2014 | Biradar | H04L 63/08 380/44 |
| 2016/0043996 A1* | 2/2016 | Syed Mohamed | H04L 63/04 726/1 |
| 2017/0085372 A1* | 3/2017 | Anderson | H04L 63/061 |
| 2017/0104850 A1* | 4/2017 | Arangasamy | H04L 12/4633 |
| 2017/0359317 A1* | 12/2017 | Anderson | H04L 9/14 |
| 2019/0116183 A1* | 4/2019 | Hussain | H04L 63/08 |
| 2019/0173856 A1* | 6/2019 | Gareau | H04L 9/3215 |
| 2019/0327542 A1* | 10/2019 | Rivaud | H04L 49/40 |
| 2020/0366651 A1 | 11/2020 | Gupta et al. | |

\* cited by examiner

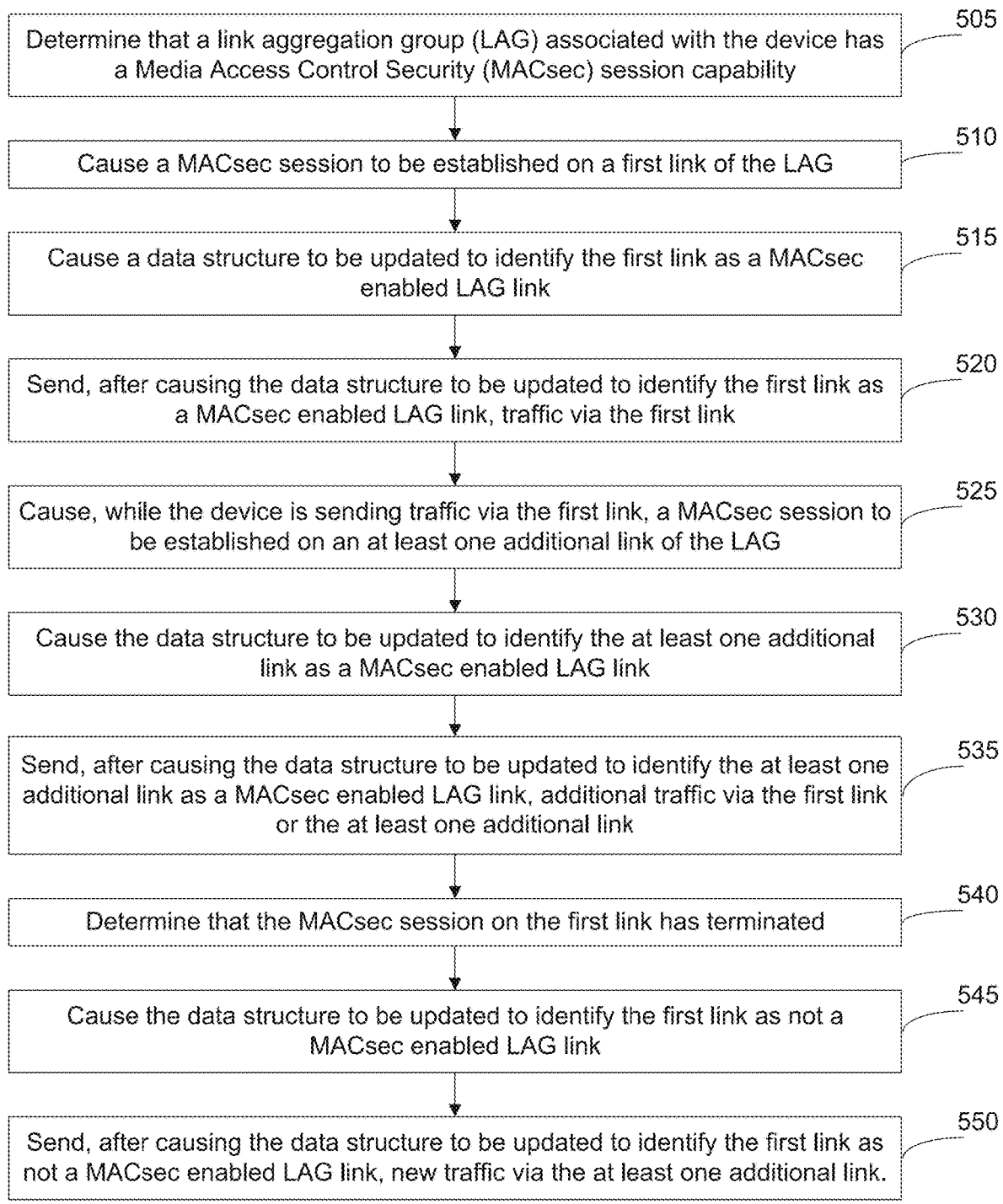

- 605: Determine that a Media Access Control Security (MACsec) session has been established on a first link of a link aggregation group (LAG)
- 610: Cause a data structure to be updated to identify the first link as a MACsec enabled LAG link
- 615: Send, after causing the data structure to be updated to identify the first link as a MACsec enabled LAG link, traffic via the first link
- 620: Determine, while sending traffic via the first link, that a MACsec session has been established on a plurality of additional links of the LAG
- 625: Cause the data structure to be updated to identify the plurality of additional links as MACsec enabled LAG links
- 630: Send, after causing the data structure to be updated to identify the plurality of additional links as MACsec enabled LAG links, additional traffic via the first link and the plurality of additional links
- 635: Determine that the MACsec session on the first link has terminated
- 640: Cause the data structure to be updated to identify the first link as not a MACsec enabled LAG link
- 645: Send, after causing the data structure to be updated to identify the first link as not a MACsec enabled LAG link, new traffic via the plurality of additional links
- 650: Determine that a MACsec session has been reestablished on the first link
- 655: Cause the data structure to be updated to identify the first link as a MACsec enabled LAG link again
- 660: Send, after causing the data structure to be updated to identify the first link as a MACsec enabled LAG link again, additional new traffic via the first link and the plurality of additional links.

MEDIA ACCESS CONTROL SECURITY (MACSEC) ENABLED LINKS OF A LINK AGGREGATION GROUP (LAG)

RELATED APPLICATION

This application is a continuation of U.S. patent application Ser. No. 16/415,494, filed May 17, 2019, which is incorporated herein by reference in its entirety.

BACKGROUND

Media Access Control Security (MACsec) provides secure communication for traffic on physical links, such as Ethernet links. MACsec provides point-to-point security on links between directly connected devices.

SUMMARY

According to some implementations, a method may include causing, by a device, a Media Access Control Security (MACsec) session to be established on a first link of a link aggregation group (LAG) that includes a plurality of links with a different device; causing, by the device, a data structure to be updated to identify the first link as a MACsec enabled LAG link; sending, by the device and after causing the data structure to be updated to identify the first link as a MACsec enabled LAG link, traffic via the first link; causing, by the device and while the device is sending traffic via the first link, a MACsec session to be established on at least one additional link of the LAG; causing, by the device, the data structure to be updated to identify the at least one additional link as a MACsec enabled LAG link; and sending, by the device and after causing the data structure to be updated to identify the at least one additional link as a MACsec enabled LAG link, additional traffic via the first link and the at least one additional link.

According to some implementations, a device may comprise one or more memories; and one or more processors, communicatively coupled to the one or more memories, to: determine that a link aggregation group (LAG) associated with the device has a Media Access Control Security (MACsec) capability; cause a MACsec session to be established on a first link of the LAG; cause a data structure to be updated to identify the first link as a MACsec enabled LAG link; send, after causing the data structure to be updated to identify the first link as a MACsec enabled LAG link, traffic via the first link; cause, while the device is sending traffic via the first link, a MACsec session to be established on an at least one additional link of the LAG; cause the data structure to be updated to identify the at least one additional link as a MACsec enabled LAG link; send, after causing the data structure to be updated to identify the at least one additional link as a MACsec enabled LAG link, additional traffic via the first link or the at least one additional link; determine that the MACsec session on the first link has terminated; cause the data structure to be updated to identify the first link as not a MACsec enabled LAG link; and send, after causing the data structure to be updated to identify the first link as not a MACsec enabled LAG link, new traffic via the at least one additional link.

According to some implementations, a non-transitory computer-readable medium may store one or more instructions. The one or more instructions, when executed by one or more processors, may cause the one or more processors to: determine that a Media Access Control Security (MACsec) session has been established on a first link of a link aggregation group (LAG); cause a data structure to be updated to identify the first link as a MACsec enabled LAG link; send, after causing the data structure to be updated to identify the first link as a MACsec enabled LAG link, traffic via the first link; determine, while sending traffic via the first link, that a MACsec session has been established on a plurality of additional links of the LAG; cause the data structure to be updated to identify the plurality of additional links as MACsec enabled LAG links; and send, after causing the data structure to be updated to identify the plurality of additional links as MACsec enabled LAG links, additional traffic via the first link and the plurality of additional links; determine that the MACsec session on the first link has terminated; cause the data structure to be updated to identify the first link as not a MACsec enabled LAG link; send, after causing the data structure to be updated to identify the first link as not a MACsec enabled LAG link, new traffic via the plurality of additional links; determine that a MACsec session has been reestablished on the first link; cause the data structure to be updated to identify the first link as a MACsec enabled LAG link again; and send, after causing the data structure to be updated to identify the first link as a MACsec enabled LAG link again, additional new traffic via the first link and the plurality of additional links.

BRIEF DESCRIPTION OF THE DRAWINGS

FIGS. 4-6 are flow charts of example processes for a Media Access Control Security (MACsec) enabled links of a link aggregation group (LAG).

DETAILED DESCRIPTION

Figure 1A:
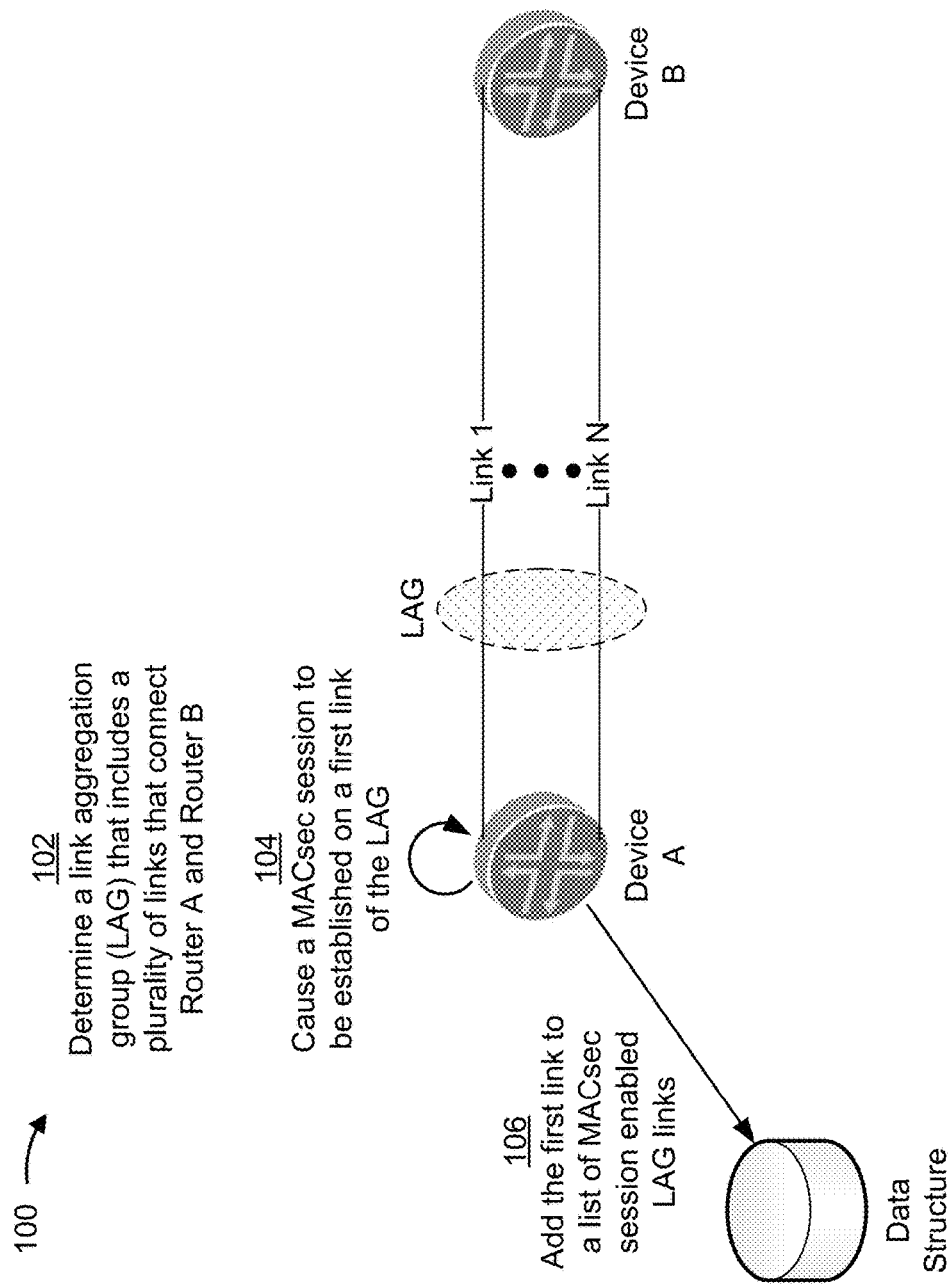
FIGS. 1A-1E are diagrams of example implementations described herein.

The following detailed description of example implementations refers to the accompanying drawings. The same reference numbers in different drawings may identify the same or similar elements.

In some cases, a link aggregation group (LAG) aggregates physical links between two directly connected devices to increase bandwidth and connection reliability between the two devices. In some cases, Media Access Control Security (MACsec) provides point-to-point security on a physical link between two directly connected devices to ensure integrity of data transmitted between the two devices. Issues arise when LAG is used in combination with MACsec. For example, in some cases, a device may be configured to transmit traffic to a different device via a particular MACsec enabled link of the LAG, but may not be able to transmit the traffic if a MACsec session has not been established and/or has terminated on the particular link. The device may drop the traffic while waiting for the MACsec session to be reestablished on the particular link, even if other MACsec enabled links are available in the LAG. As another example, the device may be configured to use the particular MACsec enabled link of the LAG, but cannot use other MACsec enabled links of the LAG, thereby reducing the ability of the LAG to provide additional bandwidth to transmit the traffic to the different device.

Some implementations described herein provide a device that may send traffic to a different device via any MACsec enabled link of a LAG. In some implementations, the device may cause a MACsec session to be established on a first link of a LAG that includes a plurality of links with a different device. In some implementations, the device may cause a data structure to be updated to identify the first link as a MACsec enabled LAG link and may send traffic via the first link to the different device. In some implementations, the device may cause a MACsec session to be established on at least one additional link of the LAG and may cause the data structure to be updated to identify the at least one additional link as a MACsec enabled LAG link. In some implementations, the device may send, based on causing the data structure to be updated to identify the first link and the at least one additional link as a MACsec enabled LAG links, additional traffic via the first link and the at least one additional link to the different device.

In this way, some implementations described herein prevent traffic from being dropped by enabling the device to send traffic on any MACsec enabled link of the LAG, even if a particular link of the LAG is not currently MACsec enabled. Moreover, some implementations enable the device to increase bandwidth for MACsec designated traffic by sending the traffic over multiple MACsec enabled links of the LAG instead of just one MACsec enabled link.

FIGS. 1A-1E are diagrams of one or more example implementations 100 described herein. Example implementation(s) 100 may include a first device (shown in FIGS. 1A-1E as device A) and/or a second device (shown in FIGS. 1A-1E as device B). The first device and/or the second device may each include various types of network devices, such as a router, a gateway, a switch, a bridge, a wireless access point, a base station, a firewall, and/or the like. The first device and the second device may be included in a network, such as a cellular network, a local area network (LAN), a core network, an access network, a wide area network (WAN) such as the Internet, a cloud network, and/or the like.

As shown in FIG. 1A, a link aggregation group (LAG) may include a plurality of links (shown as link 1 through link N) between the first device and the second device. The plurality of links may be Ethernet links. A link may connect a physical port of the first device to a physical port of the second device. The LAG may combine the plurality of links together to make a single high-bandwidth data path between the first device and the second device. That is, a data transmission between the first device and the second device may be distributed over the plurality of links. In some implementations, the LAG may be a static LAG (e.g., a LAG that supports static link aggregation) or a dynamic LAG (e.g., a LAG that supports dynamic link aggregation, such as a LAG that conforms to the link aggregation control protocol (LACP)). In some implementations, the LAG may have a MACsec capability. That is, the first device and/or the second device may be able to establish a MACsec session on at least one link of the plurality of links of the LAG. In this way the LAG may comprise one or more MACsec session capable links and/or one or more regular links (e.g., links that are not MACsec enabled).

As shown by reference number 102, the first device may identify and/or determine the LAG. The first device may identify and/or determine that the LAG has a MACsec capability. For example, the first device may determine that at least one link of the LAG is able to establish a MACsec session. As another example, the first device may determine that each link, of the plurality of links, of the LAG is able to establish a MACsec session. Additionally, or alternatively, the first device may determine that at least one link of the LAG is not MACsec enabled.

As shown by reference number 104, the first device may cause a MACsec session to be established on a first link of the LAG. For example, the first device and the second device may exchange security keys via the first link and verify the security keys to establish the MACsec session on the first link. In some implementations, the first device may initiate establishment of the MACsec session on the first link. Additionally, or alternatively, the first device may cause the second device (e.g., by sending a message to the second device) to initiate establishment of the MACsec session on the first link. The first device may determine that the MACsec session has been successfully established on the first link.

In some implementations, the first device may be associated with a data structure. The data structure may be included in the first device and/or may be accessible to the first device (e.g., via a network). For example, the data structure may include interface selection criteria of the LAG (e.g., criteria for the first device to send information over one or more or links of the LAG). The data structure may include a list of MACsec session enabled LAG links. For example, the data structure may identify, for each link of the plurality of links of the LAG, whether the link is a MACsec enabled LAG link (e.g., whether a MACsec session has been established on the link). Additionally, or alternatively, the data structure may include a list of LAG links that are not MACsec enabled LAG links.

As shown by reference number 106, the first device may cause the data structure to be updated to identify the first link as a MACsec enabled LAG link. For example, the first device may cause the data structure (e.g., by sending a message to the data structure) to add the first link to the list of MACsec session enabled LAG links.

Figure 1B:
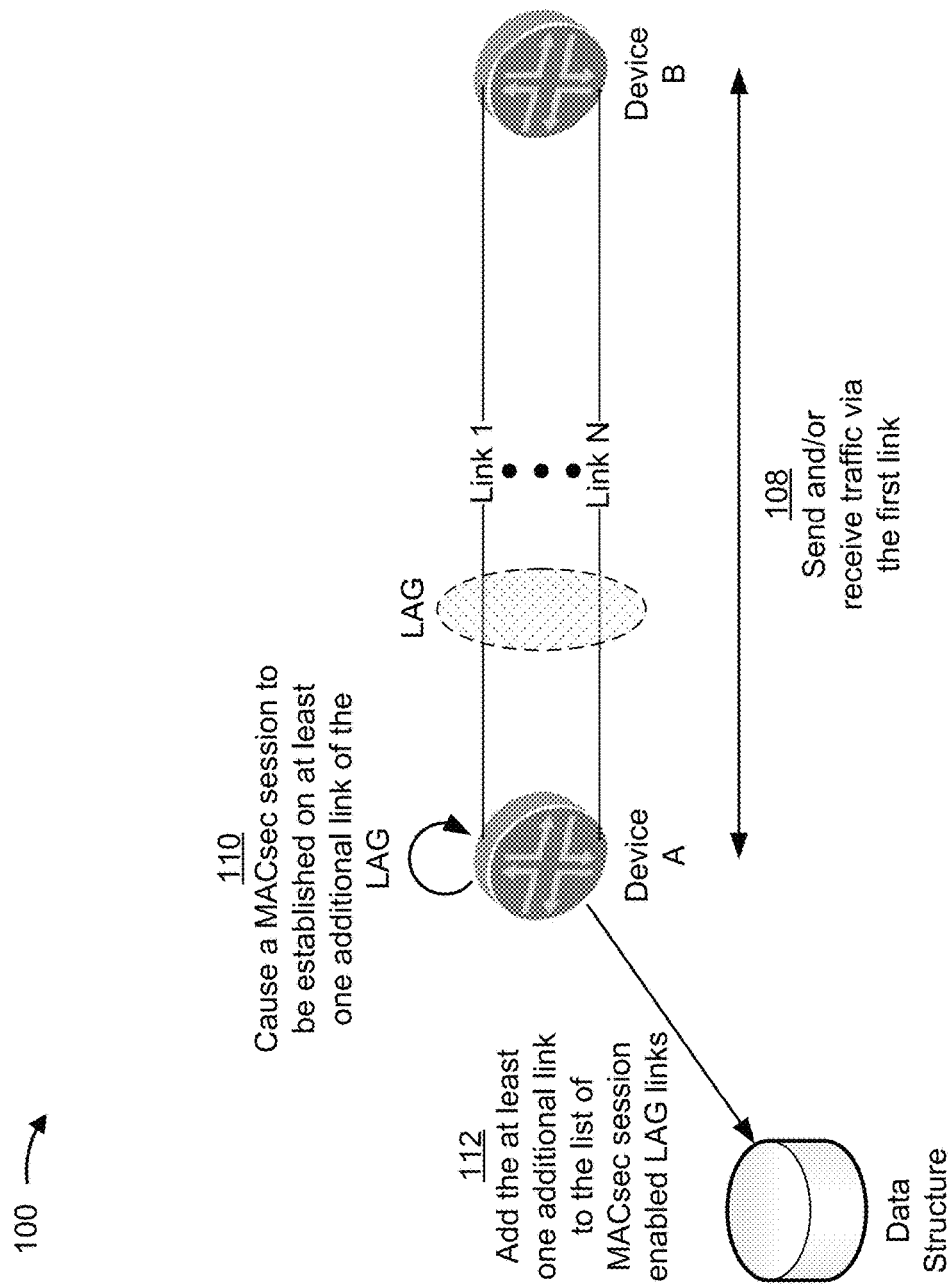

As shown in FIG. 1B and by reference number 108, the first device may send and/or receive traffic via the first link. The traffic may include one or more packets. In some implementations, the traffic may be encrypted and/or otherwise formatted for transmission via a MACsec session. Additionally, or alternatively, the first device may send alternative traffic (e.g., traffic not designated to be sent via a MACsec session enabled link, such as plain text traffic) via at least one link of the LAG that is not MACsec enabled.

In some implementations, to cause the first device to send the traffic and/or the one or more packets of the traffic via the first link, the first device may configure the first device to send the traffic and/or the one or more packets of the traffic via the first link. For example, the first device may configure, based on determining that the first link is a MACsec enabled LAG link and/or that no other link of the LAG is a MACsec enabled LAG link, the first device to send the traffic and/or the one or more packets of the traffic via the first link and not any other link of the LAG. The first device may search the list of MACsec session enabled LAG links to determine that the first link is a MACsec enabled LAG link. Additionally, or alternatively, the first device may search the list of MACsec session enabled LAG links to determine that no other link of the LAG is a MACsec enabled LAG link.

As shown by reference number 110, the first device may cause a MACsec session to be established on at least one additional link of the LAG in a similar manner as described herein in relation to FIG. 1A. For example, the first device may initiate establishment of the MACsec session on the at least one additional link and/or may cause the second device (e.g., by sending a message to the second device) to initiate establishment of the MACsec session on the at least one additional link. The first device may cause the MACsec session to be established on the at least one additional link while the first device sends and/or receives the traffic via the first link. The first device may determine that the MACsec session has been successfully established on the at least one additional link.

As shown by reference number 112, the first device may cause the data structure to be updated to identify the at least one additional link as a MACsec enabled LAG link in a similar manner as described herein in relation to FIG. 1A. For example, the first device may cause the data structure (e.g., by sending a message to the data structure) to add the at least one additional link to the list of MACsec session enabled LAG links.

Figure 1C:
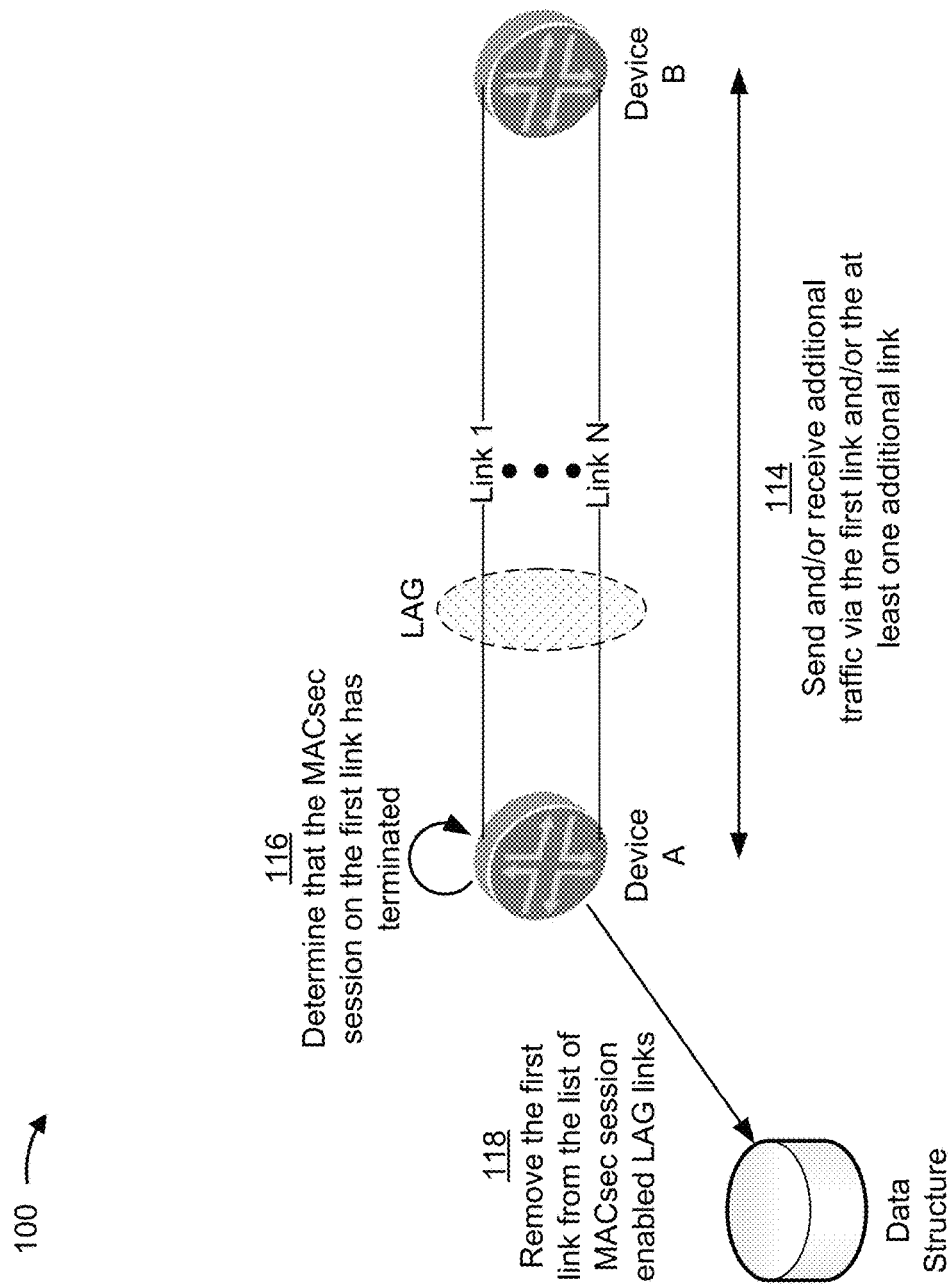

As shown in FIG. 1C and by reference number 114, the first device may send and/or receive additional traffic via the first link and/or the at least one additional link in a similar manner as described herein in relation to FIG. 1B. For example, the additional traffic may include first additional traffic and/or second additional traffic and the first device may send the first additional traffic via the first link and/or may send the second additional traffic via the at least one additional link. In some implementations, the additional traffic may include one or more packets. In some implementations, the additional traffic may be encrypted and/or otherwise formatted for transmission via a MACsec session. Additionally, or alternatively, the first device may send alternative traffic (e.g., traffic not designated to be sent via a MACsec session enabled link, such as plain text traffic) via at least one link of the LAG that is not MACsec enabled.

In some implementations, to cause the first device to send the additional traffic and/or the one or more packets of the additional traffic via the first link and/or the at least one additional link, the first device may configure the first device to send the additional traffic and/or the one or more packets of the additional traffic via the first link and/or the at least one additional link. For example, the first device may configure, based on determining that the first link is a MACsec enabled LAG link and/or that the at least one additional link of the LAG are MACsec enabled LAG links, the first device to send the additional traffic and/or the one or more packets of the additional traffic via the first link and/or the at least one additional link. The first device may search the list of MACsec session enabled LAG links to determine that the first link and the at least one additional link are MACsec enabled LAG links.

As another example, the first device may identify and/or determine a first set of packets and/or a second set of packets of the one or more packets of the additional traffic. The first device may configure the first device to send the first set of packets via the first link and/or the second set of packets via the at least one additional link. Accordingly, based on configuring the first device, the first device may send the first set of packets via the first link and the second set of packets via the at least one additional link.

In some implementations, a MACsec session on a link of the LAG may flap and/or terminate (e.g., because of connection issues between the first device and the second device, processing issues associated with the first device, processing issues associated with the second device, and/or the like). For example, the MACsec session on the first link may terminate. As shown by reference number 116, the first device may determine that the MACsec session on the first link has terminated (e.g., by testing the first link).

As shown by reference number 118, the first device may cause the data structure to be updated to identify the first link as not a MACsec enabled LAG link. For example, the first device may cause the data structure (e.g., by sending a message to the data structure) to remove the first link from the list of MACsec session enabled LAG links.

Figure 1D:
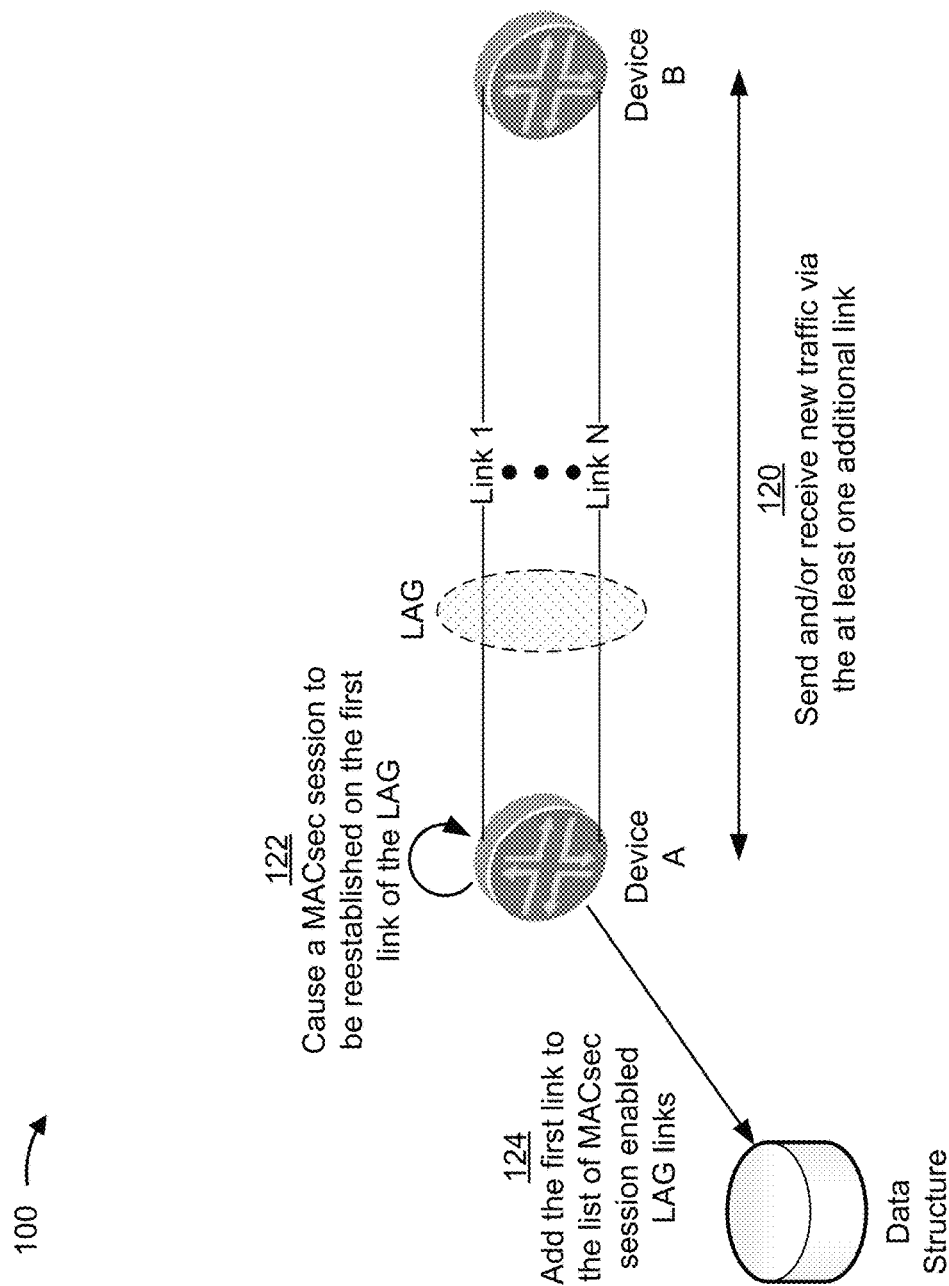

As shown in FIG. 1D and by reference number 120, the first device may send and/or receive new traffic via the at least one additional link and not the first link. For example, the at least one additional link may include multiple links and the new traffic may include first new traffic and/or second new traffic. The first device may send the first new traffic via a first particular link of the at least one additional link and/or may send the second new traffic via a second particular link of the at least one additional link. The new traffic may include one or more packets. In some implementations, the new traffic may be encrypted and/or otherwise formatted for transmission via a MACsec session. Additionally, or alternatively, the first device may send alternative traffic (e.g., traffic not designated to be sent via a MACsec session enabled link, such as plain text traffic) via at least one link of the LAG that is not MACsec enabled.

In some implementations, to cause the first device to send the new traffic and/or the one or more packets of the new traffic via the at least one additional link, the first device may configure the first device to send the new traffic and/or the one or more packets of the new traffic via the at least one additional link and not the first link. For example, the first device may configure, based on determining that the at least one additional link of the LAG is a MACsec enabled LAG link and/or that the first link is not a MACsec enabled LAG link, the first device to send the new traffic and/or the one or more packets of the new traffic via the at least one additional link and not the first link. The first device may search the list of MACsec session enabled LAG links to determine that the at least one additional link is a MACsec enabled LAG link and that the first link is not a MACsec enabled LAG link.

In some implementations, the MACsec session on the at least one additional link may terminate and the first device may determine that the MACsec session on the at least one additional link has terminated (e.g., by testing the at least one additional link) in a similar manner as described herein in relation to FIG. 1C. Accordingly, the first device may cause the data structure to be updated to identify the at least one additional link as not a MACsec enabled LAG link and may configure the first device to not send additional new traffic via the at least one additional link.

Additionally, or alternatively, as shown by reference number 122, the first device may cause a MACsec session to be reestablished on the first link of the LAG in a similar manner as described herein in relation to FIG. 1A. For example, the first device may initiate establishment of the MACsec session on the first link and/or may cause the second device (e.g., by sending a message to the second device) to initiate establishment of the MACsec session on the first link. The first device may cause the MACsec session to be established on the first link while the first device sends and/or receives the new traffic via the at least one additional link. The first device may determine that the MACsec session has been successfully reestablished on the first link.

As shown by reference number 124, the first device may cause the data structure to be updated to identify the first link as a MACsec enabled LAG link again in a similar manner as described herein in relation to FIG. 1A. For example, the first device may cause the data structure (e.g., by sending a message to the data structure) to add the first link to the list of MACsec session enabled LAG links again.

Figure 1E:
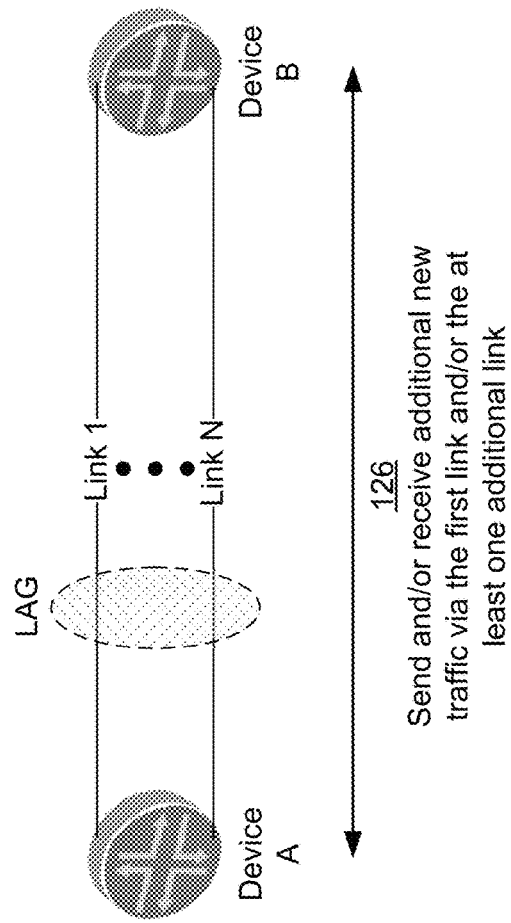

As shown in FIG. 1E and by reference number 126, the first device may send and/or receive additional new traffic via the first link and/or the at least one additional link in a similar manner as described herein in relation to FIG. 1C. For example, the additional new traffic may include first additional new traffic and/or second additional new traffic and the first device may send the first additional new traffic via the first link and/or may send the second additional new traffic via the at least one additional link. Additionally, or alternatively, the at least one additional link may include multiple links and the additional new traffic may include first additional new traffic, second additional new traffic, third additional new traffic and/or the like. The first device may send the first additional new traffic via the first link, may send the second additional new traffic via a first particular link of the at least one additional link, and/or may send the third additional new traffic via a second particular link of the at least one additional link. In some implementations, the additional new traffic may include one or more packets. In some implementations, the additional new traffic may be encrypted and/or otherwise formatted for transmission via a MACsec session. Additionally, or alternatively, the first device may send alternative traffic (e.g., traffic not designated to be sent via a MACsec session enabled link, such as plain text traffic) via at least one link of the LAG that is not MACsec enabled.

In some implementations, to cause the first device to send the additional new traffic and/or the one or more packets of the additional new traffic via the first link and/or the at least one additional link, the first device may configure the first device to send the additional new traffic and/or the one or more packets of the additional new traffic via the first link and/or the at least one additional link. For example, the first device may configure, based on determining that the first link is a MACsec enabled LAG link and/or that the at least one additional link of the LAG are MACsec enabled LAG links, the first device to send the additional new traffic and/or the one or more packets of the additional new traffic via the first link and/or the at least one additional link. The first device may search the list of MACsec session enabled LAG links to determine that the first link and the at least one additional link are MACsec enabled LAG links.

As another example, the first device may identify and/or determine a first set of packets and/or a second set of packets of the one or more packets of the additional new traffic. The first device may configure the first device to send the first set of packets via the first link and/or the second set of packets via the at least one additional link. Accordingly, based on configuring the first device, the first device may send the first set of packets via the first link and the second set of packets via the at least one additional link.

As indicated above, FIGS. 1A-1E are provided merely as one or more examples. Other examples may differ from what is described with regard to FIGS. 1A-1E.

Figure 2:
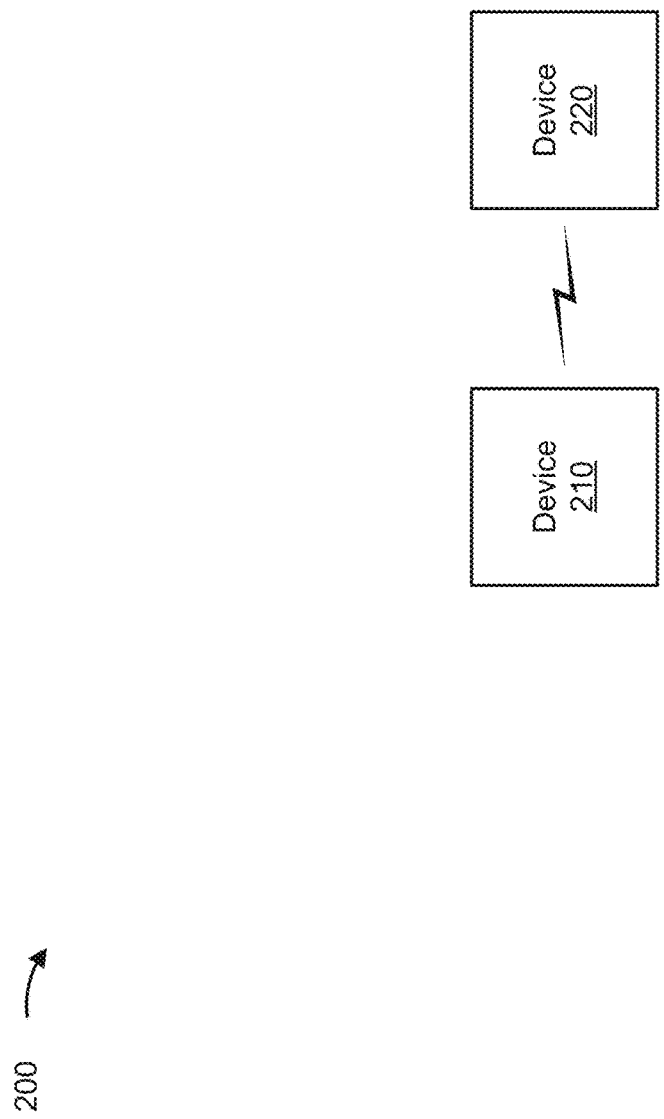
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include device 210 and/or device 220. Devices of environment 200 may interconnect via wired connections, wireless connections, or a combination of wired and wireless connections.

Device 210 includes one or more devices capable of receiving, storing, generating, processing, forwarding, and/or transferring information. For example, device 210 may include a router, a switch, a gateway, a firewall device, a modem, a hub, a bridge, a network interface controller (NIC), a reverse proxy, a server (e.g., a proxy server), a multiplexer, a security device, an intrusion detection device, a load balancer, or a similar device. In some implementations, device 210 may be a physical device implemented within a housing, such as a chassis. In some implementations, device 210 may be a virtual device implemented by one or more computer devices of a cloud computing environment or a data center. In some implementations, device 210 may include and/or communicate with a data structure. In some implementations, device 210 may communicate with device 220 via one or more links of a LAG. In some implementations, the one or more links may be MACsec enabled links.

Device 220 includes one or more devices capable of receiving, storing, generating, processing, forwarding, and/or transferring information. For example, device 220 may include a router, a switch, a gateway, a firewall device, a modem, a hub, a bridge, a network interface controller (NIC), a reverse proxy, a server (e.g., a proxy server), a multiplexer, a security device, an intrusion detection device, a load balancer, or a similar device. In some implementations, device 220 may be a physical device implemented within a housing, such as a chassis. In some implementations, device 220 may be a virtual device implemented by one or more computer devices of a cloud computing environment or a data center. In some implementations, device 220 may include and/or communicate with a data structure. In some implementations, device 220 may communicate with device 210 via one or more links of a LAG. In some implementations, the one or more links may be MACsec enabled links.

The number and arrangement of devices and networks shown in FIG. 2 are provided as one or more examples. In practice, there may be additional devices, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3A:
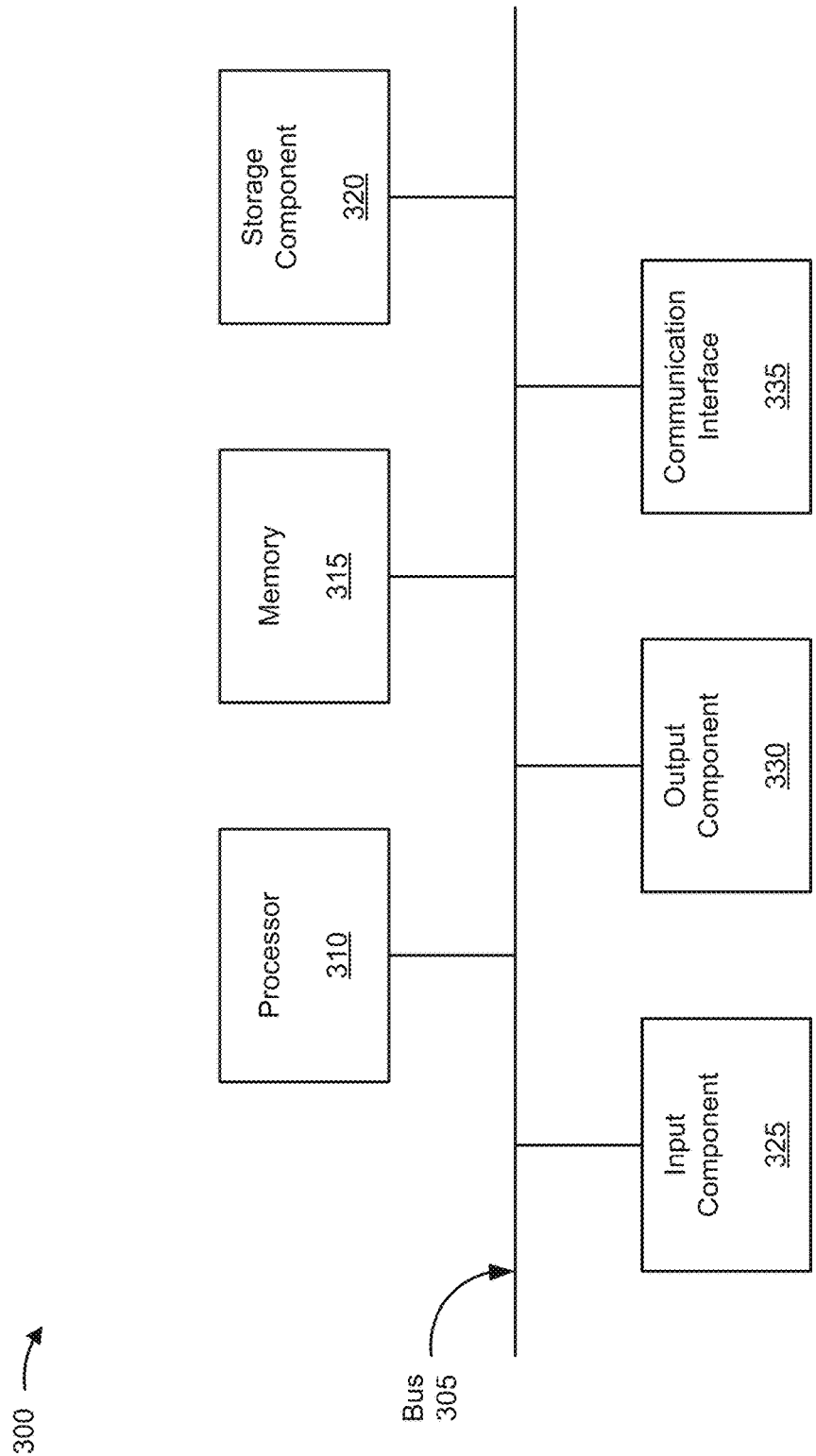
FIGS. 3A and 3B are diagrams of example components of one or more devices of FIG. 2.
Figure 3B:
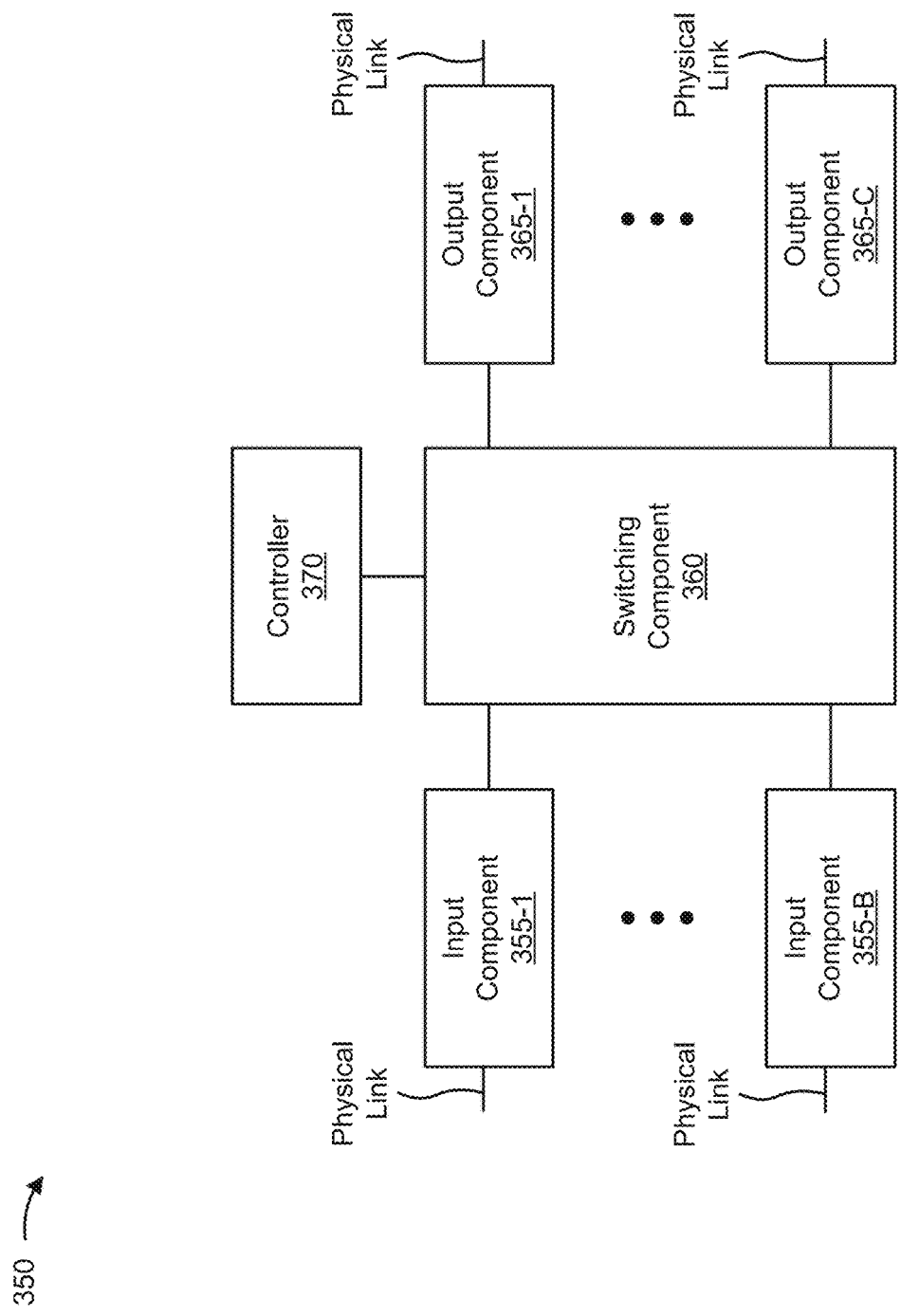

FIGS. 3A-3B are diagrams of example components of one or more devices of FIG. 2. FIG. 3A is a diagram of example components of a device 300. Device 300 may correspond to device 210, device 220, and/or the like. In some implementations, device 210, device 220, and/or the like may include one or more devices 300 and/or one or more components of device 300. As shown in FIG. 3A, device 300 may include a bus 305, a processor 310, a memory 315, a storage component 320, an input component 325, an output component 330, and a communication interface 335.

Bus 305 includes a component that permits communication among the components of device 300. Processor 310 is implemented in hardware, firmware, or a combination of hardware and software. Processor 310 takes the form of a central processing unit (CPU), a graphics processing unit (GPU), an accelerated processing unit (APU), a microprocessor, a microcontroller, a digital signal processor (DSP), a field-programmable gate array (FPGA), an ASIC, or another type of processing component. In some implementations, processor 310 includes one or more processors capable of being programmed to perform a function. Memory 315 includes a random access memory (RAM), a read only memory (ROM), and/or another type of dynamic or static storage device (e.g., a flash memory, a magnetic memory, and/or an optical memory) that stores information and/or instructions for use by processor 310.

Storage component 320 stores information and/or software related to the operation and use of device 300. For example, storage component 320 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 325 includes a component that permits device 300 to receive information, such as via user input (e.g., a touch screen display, a keyboard, a keypad, a mouse, a button, a switch, and/or a microphone). Additionally, or alternatively, input component 325 may include a sensor for sensing information (e.g., a global positioning system (GPS) component, an accelerometer, a gyroscope, and/or an actuator). Output component 330 includes a component that provides output information from device 300 (e.g., a display, a speaker, and/or one or more light-emitting diodes (LEDs)).

Communication interface 335 includes a transceiver-like component (e.g., a transceiver and/or a separate receiver and transmitter) that enables device 300 to communicate with other devices, such as via a wired connection, a wireless connection, or a combination of wired and wireless connections. Communication interface 335 may permit device 300 to receive information from another device and/or provide information to another device. For example, communication interface 335 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 310 executing software instructions stored by a non-transitory computer-readable medium, such as memory 315 and/or storage component 320. A computer-readable medium is defined herein as a non-transitory memory device. A memory device includes memory space within a single physical storage device or memory space spread across multiple physical storage devices.

Software instructions may be read into memory 315 and/or storage component 320 from another computer-readable medium or from another device via communication interface 335. When executed, software instructions stored in memory 315 and/or storage component 320 may cause processor 310 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3A are provided as an example. In practice, device 300 may include additional components, fewer components, different components, or differently arranged components than those shown in FIG. 3A. Additionally, or alternatively, a set of components (e.g., one or more components) of device 300 may perform one or more functions described as being performed by another set of components of device 300.

FIG. 3B is a diagram of example components of a device 350. Device 350 may correspond to device 210, device 220, and/or the like. In some implementations, device 210, device 220, and/or the like may include one or more devices 350 and/or one or more components of device 350. As shown in FIG. 3B, device 350 may include one or more input components 355-1 through 355-B (B≥1) (hereinafter referred to collectively as input components 355, and individually as input component 355), a switching component 360, one or more output components 365-1 through 365-C (C≥1) (hereinafter referred to collectively as output components 365, and individually as output component 365), and a controller 370.

Input component 355 may be points of attachment for physical links and may be points of entry for incoming traffic, such as packets. Input component 355 may process incoming traffic, such as by performing data link layer encapsulation or decapsulation. In some implementations, input component 355 may send and/or receive packets. In some implementations, input component 355 may include an input line card that includes one or more packet processing components (e.g., in the form of integrated circuits), such as one or more interface cards (IFCs), packet forwarding components, line card controller components, input ports, processors, memories, and/or input queues. In some implementations, device 350 may include one or more input components 355.

Switching component 360 may interconnect input components 355 with output components 365. In some implementations, switching component 360 may be implemented via one or more crossbars, via busses, and/or with shared memories. The shared memories may act as temporary buffers to store packets from input components 355 before the packets are eventually scheduled for delivery to output components 365. In some implementations, switching component 360 may enable input components 355, output components 365, and/or controller 370 to communicate.

Output component 365 may store packets and may schedule packets for transmission on output physical links. Output component 365 may support data link layer encapsulation or decapsulation, and/or a variety of higher-level protocols. In some implementations, output component 365 may send packets and/or receive packets. In some implementations, output component 365 may include an output line card that includes one or more packet processing components (e.g., in the form of integrated circuits), such as one or more IFCs, packet forwarding components, line card controller components, output ports, processors, memories, and/or output queues. In some implementations, device 350 may include one or more output components 365. In some implementations, input component 355 and output component 365 may be implemented by the same set of components (e.g., and input/output component may be a combination of input component 355 and output component 365).

Controller 370 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, controller 370 may include one or more processors that can be programmed to perform a function.

In some implementations, controller 370 may include a RAM, a ROM, and/or another type of dynamic or static storage device (e.g., a flash memory, a magnetic memory, an optical memory, etc.) that stores information and/or instructions for use by controller 370.

In some implementations, controller 370 may communicate with other devices, networks, and/or systems connected to device 300 to exchange information regarding network topology. Controller 370 may create routing tables based on the network topology information, create forwarding tables based on the routing tables, and forward the forwarding tables to input components 355 and/or output components 365. Input components 355 and/or output components 365 may use the forwarding tables to perform route lookups for incoming and/or outgoing packets.

Controller 370 may perform one or more processes described herein. Controller 370 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 370 from another computer-readable medium or from another device via a communication interface. When executed, software instructions stored in a memory and/or storage component associated with controller 370 may cause controller 370 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3B are provided as an example. In practice, device 350 may include additional components, fewer components, different components, or differently arranged components than those shown in FIG. 3B. Additionally, or alternatively, a set of components (e.g., one or more components) of device 350 may perform one or more functions described as being performed by another set of components of device 350.

Figure 4:
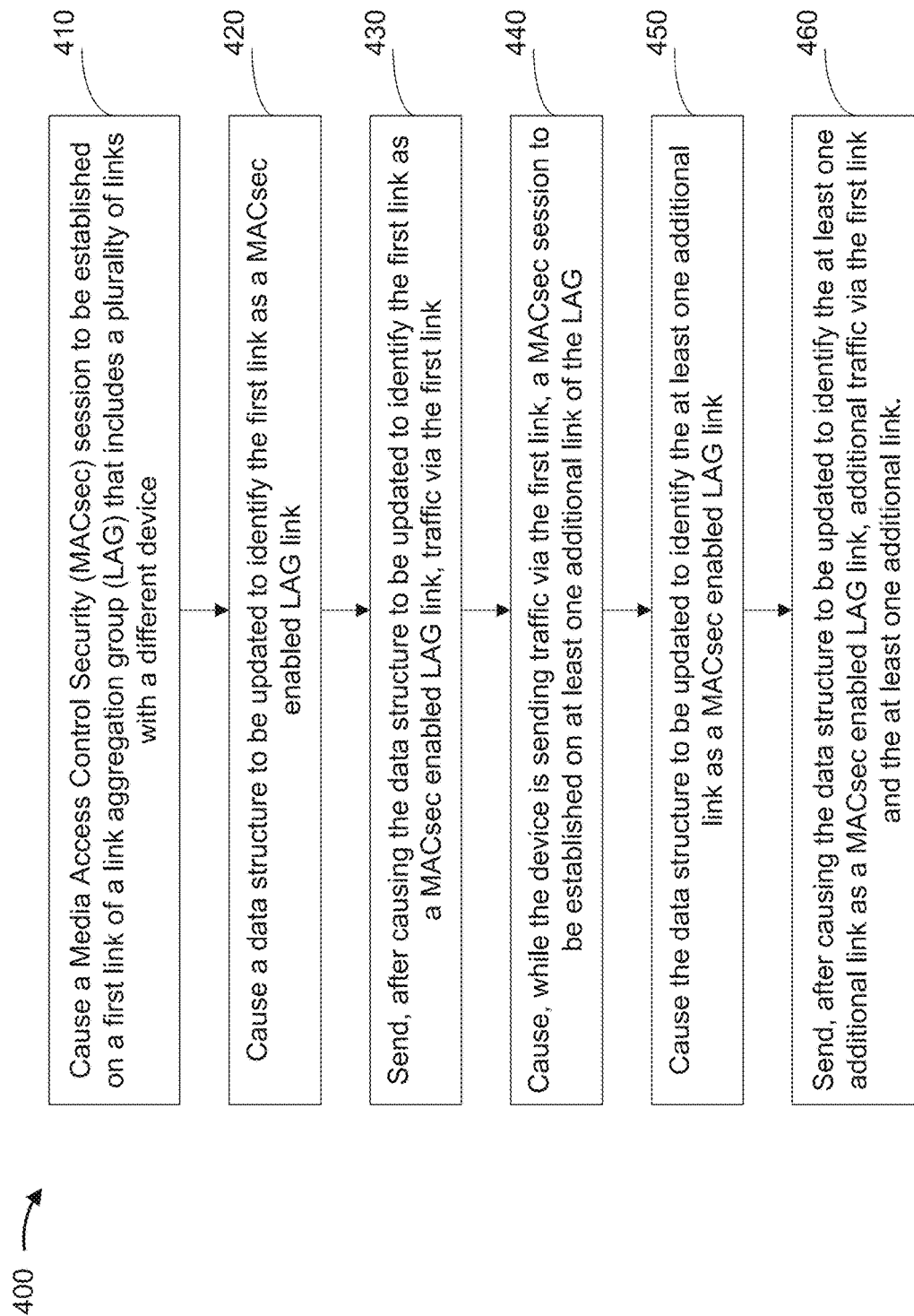

FIG. 4 is a flow chart of an example process 400 for Media Access Control Security (MACsec) enabled links of a link aggregation group (LAG). In some implementations, one or more process blocks of FIG. 4 may be performed by a device (e.g., device 210). In some implementations, one or more process blocks of FIG. 4 may be performed by another device or a group of devices separate from or including the device.

As shown in FIG. 4, process 400 may include causing a MACsec session to be established on a first link of a LAG that includes a plurality of links with a different device (block 410). For example, the device (e.g., using processor 310, memory 315, storage component 320, input component 325, output component 330, communication interface 335, input component 355, switching component 360, output component 365, controller 370, and/or the like) may cause a MACsec session to be established on a first link of a LAG that includes a plurality of links with a different device, as described above.

As further shown in FIG. 4, process 400 may include causing a data structure to be updated to identify the first link as a MACsec enabled LAG link (block 420). For example, the device (e.g., using processor 310, memory 315, storage component 320, input component 325, output component 330, communication interface 335, input component 355, switching component 360, output component 365, controller 370, and/or the like) may cause a data structure to be updated to identify the first link as a MACsec enabled LAG link, as described above.

As further shown in FIG. 4, process 400 may include sending, after causing the data structure to be updated to identify the first link as a MACsec enabled LAG link, traffic via the first link (block 430). For example, the device (e.g., using processor 310, memory 315, storage component 320, input component 325, output component 330, communication interface 335, input component 355, switching component 360, output component 365, controller 370, and/or the like) may send, after causing the data structure to be updated to identify the first link as a MACsec enabled LAG link, traffic via the first link, as described above.

As further shown in FIG. 4, process 400 may include causing, while the device is sending traffic via the first link, a MACsec session to be established on at least one additional link of the LAG (block 440). For example, the device (e.g., using processor 310, memory 315, storage component 320, input component 325, output component 330, communication interface 335, input component 355, switching component 360, output component 365, controller 370, and/or the like) may cause, while the device is sending traffic via the first link, a MACsec session to be established on at least one additional link of the LAG, as described above.

As further shown in FIG. 4, process 400 may include causing the data structure to be updated to identify the at least one additional link as a MACsec enabled LAG link (block 450). For example, the device (e.g., using processor 310, memory 315, storage component 320, input component 325, output component 330, communication interface 335, input component 355, switching component 360, output component 365, controller 370, and/or the like) may cause the data structure to be updated to identify the at least one additional link as a MACsec enabled LAG link, as described above.

As further shown in FIG. 4, process 400 may include sending, after causing the data structure to be updated to identify the at least one additional link as a MACsec enabled LAG link, additional traffic via the first link and the at least one additional link (block 460). For example, the device (e.g., using processor 310, memory 315, storage component 320, input component 325, output component 330, communication interface 335, input component 355, switching component 360, output component 365, controller 370, and/or the like) may send, after causing the data structure to be updated to identify the at least one additional link as a MACsec enabled LAG link, additional traffic via the first link and the at least one additional link, as described above.

Process 400 may include additional implementations, such as any single implementation or any combination of implementations described below and/or in connection with one or more other processes described elsewhere herein.

In a first implementation, the LAG is a static LAG.

In a second implementation, alone or in combination with the first implementation, sending the traffic via the first link comprises determining, based on the data structure, that the first link is a MACsec enabled LAG link and that no other link of the LAG is a MACsec enabled LAG link; configuring, based on determining that the first link is a MACsec enabled LAG link and that no other link of the LAG is a MACsec enabled LAG link, the device to send the traffic via the first link and not any other link of the LAG; and sending, based on configuring the device, the traffic via the first link.

In a third implementation, alone or in combination with one or more of the first and second implementations, sending the additional traffic via the first link and the at least one additional link comprises determining, based on the data structure, that the first link and the at least one additional link are MACsec enabled LAG links; configuring, based on determining that the first link and the at least one additional link are MACsec enabled LAG links, the device to send the additional traffic via the first link and the at least one additional link; and sending, based on configuring the device, the additional traffic via the first link and the at least one additional link.

In a fourth implementation, alone or in combination with one or more of the first through third implementations, process 400 further includes determining that the MACsec session on the first link has terminated; causing the data structure to be updated to identify the first link as not a MACsec enabled LAG link; and sending, after causing the data structure to be updated to identify the first link as not a MACsec enabled LAG link, new traffic via the at least one additional link and not the first link.

In a fifth implementation, alone or in combination with one or more of the first through fourth implementations, process 400 further includes causing a MACsec session to be reestablished on the first link; causing the data structure to be updated to identify the first link as a MACsec enabled LAG link again; sending, after causing the data structure to be updated to identify the first link as a MACsec enabled LAG link again, additional new traffic via the first link or the at least one additional link.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flow chart of an example process 500 for MACsec enabled links of a LAG. In some implementations, one or more process blocks of FIG. 5 may be performed by a device (e.g., device 210). In some implementations, one or more process blocks of FIG. 5 may be performed by another device or a group of devices separate from or including the device, such as a different device (e.g., device 220) and/or the like.

As shown in FIG. 5, process 500 may include determining that a LAG associated with the device has a MACsec capability (block 505). For example, the device (e.g., using processor 310, memory 315, storage component 320, input component 325, output component 330, communication interface 335, input component 355, switching component 360, output component 365, controller 370, and/or the like) may determine that a LAG associated with the device has a MACsec capability, as described above.

As further shown in FIG. 5, process 500 may include causing a MACsec session to be established on a first link of the LAG (block 510). For example, the device (e.g., using processor 310, memory 315, storage component 320, input component 325, output component 330, communication interface 335, input component 355, switching component 360, output component 365, controller 370, and/or the like) may cause a MACsec session to be established on a first link of the LAG, as described above.

As further shown in FIG. 5, process 500 may include causing a data structure to be updated to identify the first link as a MACsec enabled LAG link (block 515). For example, the device (e.g., using processor 310, memory 315, storage component 320, input component 325, output component 330, communication interface 335, input component 355, switching component 360, output component 365, controller 370, and/or the like) may cause a data structure to be updated to identify the first link as a MACsec enabled LAG link, as described above.

As further shown in FIG. 5, process 500 may include sending, after causing the data structure to be updated to identify the first link as a MACsec enabled LAG link, traffic via the first link (block 520). For example, the device (e.g., using processor 310, memory 315, storage component 320, input component 325, output component 330, communication interface 335, input component 355, switching component 360, output component 365, controller 370, and/or the like) may send, after causing the data structure to be updated to identify the first link as a MACsec enabled LAG link, traffic via the first link, as described above.

As further shown in FIG. 5, process 500 may include causing, while the device is sending traffic via the first link, a MACsec session to be established on an at least one additional link of the LAG (block 525). For example, the device (e.g., using processor 310, memory 315, storage component 320, input component 325, output component 330, communication interface 335, input component 355, switching component 360, output component 365, controller 370, and/or the like) may cause, while the device is sending traffic via the first link, a MACsec session to be established on an at least one additional link of the LAG, as described above.

As further shown in FIG. 5, process 500 may include causing the data structure to be updated to identify the at least one additional link as a MACsec enabled LAG link (block 530). For example, the device (e.g., using processor 310, memory 315, storage component 320, input component 325, output component 330, communication interface 335, input component 355, switching component 360, output component 365, controller 370, and/or the like) may cause the data structure to be updated to identify the at least one additional link as a MACsec enabled LAG link, as described above.

As further shown in FIG. 5, process 500 may include sending, after causing the data structure to be updated to identify the at least one additional link as a MACsec enabled LAG link, additional traffic via the first link or the at least one additional link (block 535). For example, the device (e.g., using processor 310, memory 315, storage component 320, input component 325, output component 330, communication interface 335, input component 355, switching component 360, output component 365, controller 370, and/or the like) may send, after causing the data structure to be updated to identify the at least one additional link as a MACsec enabled LAG link, additional traffic via the first link or the at least one additional link, as described above.

As further shown in FIG. 5, process 500 may include determining that the MACsec session on the first link has terminated (block 540). For example, the device (e.g., using processor 310, memory 315, storage component 320, input component 325, output component 330, communication interface 335, input component 355, switching component 360, output component 365, controller 370, and/or the like) may determine that the MACsec session on the first link has terminated, as described above.

As further shown in FIG. 5, process 500 may include causing the data structure to be updated to identify the first link as not a MACsec enabled LAG link (block 545). For example, the device (e.g., using processor 310, memory 315, storage component 320, input component 325, output component 330, communication interface 335, input component 355, switching component 360, output component 365, controller 370, and/or the like) may cause the data structure to be updated to identify the first link as not a MACsec enabled LAG link, as described above.

As further shown in FIG. 5, process 500 may include sending, after causing the data structure to be updated to identify the first link as not a MACsec enabled LAG link, new traffic via the at least one additional link (block 550). For example, the device (e.g., using processor 310, memory 315, storage component 320, input component 325, output component 330, communication interface 335, input component 355, switching component 360, output component 365, controller 370, and/or the like) may send, after causing the data structure to be updated to identify the first link as not a MACsec enabled LAG link, new traffic via the at least one additional link, as described above.

Process 500 may include additional implementations, such as any single implementation or any combination of implementations described below and/or in connection with one or more other processes described elsewhere herein.

In a first implementation, the LAG is a dynamic LAG.

In a second implementation, alone or in combination with the first implementation, the traffic includes one or more packets and sending the traffic via the first link comprises configuring the device to send the one or more packets via the first link and not any other link of the LAG and causing, based on configuring the device, the one or more packets to be sent via the first link.

In a third implementation, alone or in combination with one or more of the first and second implementations, the additional traffic includes one or more packets and sending the additional traffic via the first link or the at least one additional link comprises determining a first set of packets and a second set of packets of the one or more packets; configuring the device to send the first set of packets via the first link and the second set of packets via the at least one additional link; and causing, based on configuring the device, the first set of packets to be sent via the first link and the second set of packets to be sent via the at least one additional link.

In a fourth implementation, alone or in combination with one or more of the first through third implementations, the new traffic includes one or more packets and sending the new traffic via the at least one additional link comprises configuring the device to send the one or more packets via the at least one additional link and not the first link and causing, based on configuring the device, the one or more packets to be sent via the at least one additional link.

In a fifth implementation, alone or in combination with one or more of the first through fourth implementations, process 500 further includes determining that the MACsec session on the at least one additional link has terminated and configuring the device to not send additional new traffic via the at least one additional link.

In a sixth implementation, alone or in combination with one or more of the first through fifth implementations, process 500 further includes causing a MACsec session to be reestablished on the first link; causing the data structure to be updated to identify the first link as a MACsec enabled LAG link again; and sending, after causing the data structure to be updated to identify the first link as a MACsec enabled LAG link again, additional new traffic via the first link and the at least one additional link.

In a seventh implementation, alone or in combination with one or more of the first through sixth implementations, the additional new traffic includes one or more packets and sending the additional new traffic via the first link and the at least one additional link comprises configuring the device to send a first set of packets, of the one or more packets, via the first link, and a second set of packets, of the one or more packets, via the at least one additional link and causing, based on configuring the device, the first set of packets to be sent via the first link and the second set of packets to be sent via the at least one additional link.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 for MACsec enabled links of a LAG. In some implementations, one or more process blocks of FIG. 6 may be performed by a device (e.g., device 210). In some implementations, one or more process blocks of FIG. 6 may be performed by another device or a group of devices separate from or including the device, such as a different device (e.g., device 220) and/or the like.

As shown in FIG. 6, process 600 may include determining that a MACsec session has been established on a first link of a LAG (block 605). For example, the device (e.g., using processor 310, memory 315, storage component 320, input component 325, output component 330, communication interface 335, input component 355, switching component 360, output component 365, controller 370, and/or the like) may determine that a MACsec session has been established on a first link of a LAG, as described above.

As further shown in FIG. 6, process 600 may include causing a data structure to be updated to identify the first link as a MACsec enabled LAG link (block 610). For example, the device (e.g., using processor 310, memory 315, storage component 320, input component 325, output component 330, communication interface 335, input component 355, switching component 360, output component 365, controller 370, and/or the like) may cause a data structure to be updated to identify the first link as a MACsec enabled LAG link, as described above.

As further shown in FIG. 6, process 600 may include sending, after causing the data structure to be updated to identify the first link as a MACsec enabled LAG link, traffic via the first link (block 615). For example, the device (e.g., using processor 310, memory 315, storage component 320, input component 325, output component 330, communication interface 335, input component 355, switching component 360, output component 365, controller 370, and/or the like) may send, after causing the data structure to be updated to identify the first link as a MACsec enabled LAG link, traffic via the first link, as described above.

As further shown in FIG. 6, process 600 may include determining, while sending traffic via the first link, that a MACsec session has been established on a plurality of additional links of the LAG (block 620). For example, the device (e.g., using processor 310, memory 315, storage component 320, input component 325, output component 330, communication interface 335, input component 355, switching component 360, output component 365, controller 370, and/or the like) may determine, while sending traffic via the first link, that a MACsec session has been established on a plurality of additional links of the LAG, as described above.

As further shown in FIG. 6, process 600 may include causing the data structure to be updated to identify the plurality of additional links as MACsec enabled LAG links (block 625). For example, the device (e.g., using processor 310, memory 315, storage component 320, input component 325, output component 330, communication interface 335, input component 355, switching component 360, output component 365, controller 370, and/or the like) may cause the data structure to be updated to identify the plurality of additional links as MACsec enabled LAG links, as described above.

As further shown in FIG. 6, process 600 may include sending, after causing the data structure to be updated to identify the plurality of additional links as MACsec enabled LAG links, additional traffic via the first link and the plurality of additional links (block 630). For example, the device (e.g., using processor 310, memory 315, storage component 320, input component 325, output component 330, communication interface 335, input component 355, switching component 360, output component 365, controller 370, and/or the like) may send, after causing the data structure to be updated to identify the plurality of additional links as MACsec enabled LAG links, additional traffic via the first link and the plurality of additional links, as described above.

As further shown in FIG. 6, process 600 may include determining that the MACsec session on the first link has terminated (block 635). For example, the device (e.g., using processor 310, memory 315, storage component 320, input component 325, output component 330, communication interface 335, input component 355, switching component 360, output component 365, controller 370, and/or the like) may determine that the MACsec session on the first link has terminated, as described above.

As further shown in FIG. 6, process 600 may include causing the data structure to be updated to identify the first link as not a MACsec enabled LAG link (block 640). For example, the device (e.g., using processor 310, memory 315, storage component 320, input component 325, output component 330, communication interface 335, input component 355, switching component 360, output component 365, controller 370, and/or the like) may cause the data structure to be updated to identify the first link as not a MACsec enabled LAG link, as described above.

As further shown in FIG. 6, process 600 may include sending, after causing the data structure to be updated to identify the first link as not a MACsec enabled LAG link, new traffic via the plurality of additional links (block 645). For example, the device (e.g., using processor 310, memory 315, storage component 320, input component 325, output component 330, communication interface 335, input component 355, switching component 360, output component 365, controller 370, and/or the like) may send, after causing the data structure to be updated to identify the first link as not a MACsec enabled LAG link, new traffic via the plurality of additional links, as described above.

As further shown in FIG. 6, process 600 may include determining that a MACsec session has been reestablished on the first link (block 650). For example, the device (e.g., using processor 310, memory 315, storage component 320, input component 325, output component 330, communication interface 335, input component 355, switching component 360, output component 365, controller 370, and/or the like) may determine that a MACsec session has been reestablished on the first link, as described above.

As further shown in FIG. 6, process 600 may include causing the data structure to be updated to identify the first link as a MACsec enabled LAG link again (block 655). For example, the device (e.g., using processor 310, memory 315, storage component 320, input component 325, output component 330, communication interface 335, input component 355, switching component 360, output component 365, controller 370, and/or the like) may cause the data structure to be updated to identify the first link as a MACsec enabled LAG link again, as described above.

As further shown in FIG. 6, process 600 may include sending, after causing the data structure to be updated to identify the first link as a MACsec enabled LAG link again, additional new traffic via the first link and the plurality of additional links (block 660). For example, the device (e.g., using processor 310, memory 315, storage component 320, input component 325, output component 330, communication interface 335, input component 355, switching component 360, output component 365, controller 370, and/or the like) may send, after causing the data structure to be updated to identify the first link as a MACsec enabled LAG link again, additional new traffic via the first link and the plurality of additional links, as described above.

Process 600 may include additional implementations, such as any single implementation or any combination of implementations described below and/or in connection with one or more other processes described elsewhere herein.

In a first implementation, at least one of the traffic, the additional traffic, the new traffic, or the additional new traffic is encrypted.

In a second implementation, alone or in combination with the first implementation, sending the traffic via the first link comprises determining, based on the data structure, that the first link is a MACsec enabled LAG link and sending, based on determining that the first link is a MACsec enabled LAG link, the traffic via the first link.

In a third implementation, alone or in combination with one or more of the first and second implementations, the additional traffic includes first additional traffic and second additional traffic and sending the additional traffic via the first link or the plurality of additional links comprises sending the first additional traffic via the first link and sending the second additional traffic via the plurality of additional links.

In a fourth implementation, alone or in combination with one or more of the first through third implementations, the new traffic includes first new traffic and second new traffic, and sending the new traffic via the plurality of additional links comprises sending the first new traffic via a first particular link of the plurality of additional links and sending the second new traffic via a second particular link of the plurality of additional links.

In a fifth implementation, alone or in combination with one or more of the first through fourth implementations, the additional new traffic includes first additional new traffic, second additional new traffic, and third additional new traffic, and sending the additional new traffic via the first link and the plurality of additional links comprises sending the first additional new traffic via the first link; sending the second additional new traffic via a first particular link of the plurality of additional links; and sending the third additional new traffic via a second particular link of the plurality of additional links.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term traffic or content may include a set of packets. A packet may refer to a communication structure for communicating information, such as a protocol data unit (PDU), a network packet, a datagram, a segment, a message, a block, a cell, a frame, a subframe, a slot, a symbol, a portion of any of the above, and/or another type of formatted or unformatted unit of data capable of being transmitted via a network.

As used herein, the term "component" is intended to be broadly construed as hardware, firmware, and/or a combination of hardware and software.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
    determining, by a device, that a Media Access Control Security (MACsec) session has been established on a first high-bandwidth link and a second high-bandwidth link of a link aggregation group (LAG),
        wherein the LAG combines a first plurality of low-bandwidth links to form the first high-bandwidth link and a second plurality of low-bandwidth links to create the second high-bandwidth link, and
        wherein the first high-bandwidth link has a higher bandwidth than each of the first plurality of low-bandwidth links and the second high-bandwidth link has a higher bandwidth than each of the second plurality of low-bandwidth links;
    determining, by the device, that the first high-bandwidth link has flapped and/or terminated; and
    sending or receiving, by the device and based on determining that the first high-bandwidth link has flapped and/or terminated, traffic, formatted for transmission via the MACsec session, via the second high-bandwidth link and not the first high-bandwidth link.

2. The method of claim 1, further comprising:
    identifying that the LAG has a MACsec capability,
        wherein determining that the MACsec session has been established on the first high-bandwidth link and the second high-bandwidth link of the LAG is based on identifying that the LAG has the MACsec capability.

3. The method of claim 1, further comprising:
    determining, based on determining that the MACsec session has been established on the first high-bandwidth link and the second high-bandwidth link of the LAG, that the MACsec session has not been established on a third high-bandwidth link of the LAG,
        wherein the LAG combines a third plurality of low-bandwidth links to create the third high-bandwidth link, and
        wherein the third high-bandwidth link has a higher bandwidth than each of the third plurality of low-bandwidth links.

4. The method of claim 3, further comprising:
    sending, based on determining that the MACsec session has not been established on the third high-bandwidth link, alternative traffic via the third high-bandwidth link.

5. The method of claim 1, further comprising:
    configuring, based on determining that the MACsec session has been established on the first high-bandwidth link and the second high-bandwidth link of the LAG, the device to send the traffic on one or both of the first high-bandwidth link or the second high-bandwidth link.

6. The method of claim 1, further comprising:
    updating, based on determining that the MACsec session has been established on the first high-bandwidth link and the second high-bandwidth link of the LAG, a list of MACsec session enabled LAG links, stored on a data structure, with information indicating that the first high-bandwidth link and the second high-bandwidth link are MACsec enabled LAG links.

7. The method of claim 6, further comprising:
    updating, based on determining that the first high-bandwidth link has flapped and/or terminated, the list of MACsec session enabled LAG links,
        wherein sending the traffic via the second high-bandwidth link and not the first high-bandwidth link is based on updating the list of MACsec session enabled LAG links.

8. The method of claim 1, wherein the traffic comprises a first traffic portion and a second traffic portion, wherein the second high-bandwidth link comprises a first low-bandwidth link and a second low-bandwidth link of the second plurality of low-bandwidth links, and wherein sending the traffic via the second high-bandwidth link comprises:
    sending the first traffic portion and the second traffic portion on the first low-bandwidth link and the second low-bandwidth link, respectively.

9. The method of claim 1, further comprising:
    causing, based on sending the traffic via the second high-bandwidth link and not the first high-bandwidth link, the MACsec session to be reestablished on the first high-bandwidth link; and
    sending or receiving, based on reestablishing the first high-bandwidth link, additional traffic on one or both of the first high-bandwidth link or the second high-bandwidth link.

10. The method of claim 9, further comprising:
    determining, based on sending the traffic via the second high-bandwidth link and not the first high-bandwidth link, that the second high-bandwidth link has flapped and/or terminated,
        wherein causing the MACsec session to be reestablished on the first high-bandwidth link is based on determining that the second high-bandwidth link has flapped and/or terminated.

11. A device, comprising:
one or more memories; and
one or more processors, coupled to the one or more memories, to:
determine that a Media Access Control Security (MACsec) session has been established on a first high-bandwidth link and a second high-bandwidth link of a link aggregation group (LAG),
wherein the LAG combines a first plurality of low-bandwidth links to form the first high-bandwidth link and a second plurality of low-bandwidth links to create the second high-bandwidth link, and
wherein the first high-bandwidth link has a higher bandwidth than each of the first plurality of low-bandwidth links and the second high-bandwidth link has a higher bandwidth than each of the second plurality of low-bandwidth links;
determine that the first high-bandwidth link has flapped and/or terminated; and
send, based on determining that the first high-bandwidth link has flapped and/or terminated, or receiving traffic, formatted for transmission via the MACsec session, via the second high-bandwidth link and not the first high-bandwidth link.

12. The device of claim 11, wherein the one or more processors are further to:
determine, based on determining that the MACsec session has been established on the first high-bandwidth link and the second high-bandwidth link of the LAG, that the MACsec session has not been established on a third high-bandwidth link of the LAG,
wherein the LAG combines a third plurality of low-bandwidth links to create the third high-bandwidth link, and
wherein the third high-bandwidth link has a higher bandwidth than each of the third plurality of low-bandwidth links.

13. The device of claim 11, wherein the one or more processors are further to:
configure, based on determining that the MACsec session has been established on the first high-bandwidth link and the second high-bandwidth link of the LAG, the device to send the traffic on one or both of the first high-bandwidth link or the second high-bandwidth link.

14. The device of claim 11, wherein the one or more processors are further to:
update, based on determining that the MACsec session has been established on the first high-bandwidth link and the second high-bandwidth link of the LAG, a list of MACsec session enabled LAG links, stored on a data structure, with information indicating that the first high-bandwidth link and the second high-bandwidth link are MACsec enabled LAG links.

15. The device of claim 11, wherein the traffic comprises a first traffic portion and a second traffic portion, wherein the second high-bandwidth link comprises a first low-bandwidth link and a second low-bandwidth link of the second plurality of low-bandwidth links, and wherein the one or more processors, when sending the traffic via the second high-bandwidth link, are to:
send the first traffic portion and the second traffic portion on the first low-bandwidth link and the second low-bandwidth link, respectively.

16. The device of claim 11, wherein the one or more processors are further to:
cause, based on sending the traffic via the second high-bandwidth link and not the first high-bandwidth link, the MACsec session to be reestablished on the first high-bandwidth link; and
send or receive, based on reestablishing the first high-bandwidth link, additional traffic on one or both of the first high-bandwidth link or the second high-bandwidth link.

17. A non-transitory computer-readable medium storing a set of instructions, the set of instructions comprising:
one or more instructions that, when executed by one or more processors of a device, cause the device to:
determine that a Media Access Control Security (MACsec) session has been established on a first high-bandwidth link and a second high-bandwidth link of a link aggregation group (LAG),
wherein the LAG combines a first plurality of low-bandwidth links to form the first high-bandwidth link and a second plurality of low-bandwidth links to create the second high-bandwidth link, and
wherein the first high-bandwidth link has a higher bandwidth than each of the first plurality of low-bandwidth links and the second high-bandwidth link has a higher bandwidth than each of the second plurality of low-bandwidth links;
determine that the first high-bandwidth link has flapped and/or terminated; and
send or receive, based on determining that the first high-bandwidth link has flapped and/or terminated, traffic, formatted for transmission via the MACsec session, via the second high-bandwidth link and not the first high-bandwidth link.

18. The non-transitory computer-readable medium of claim 17, wherein the one or more instructions further cause the device to:
update, based on determining that the first high-bandwidth link has flapped and/or terminated, a list of MACsec session enabled LAG links, stored on a data structure, with information indicating that the first high-bandwidth link has flapped and/or terminated,
wherein the list of MACsec session enabled LAG links further comprises information indicating that the second high-bandwidth link has an established MACsec session.

19. The non-transitory computer-readable medium of claim 17, wherein the LAG is a static LAG.

20. The non-transitory computer-readable medium of claim 17, wherein the LAG is a dynamic LAG.

* * * * *